United States Patent
Wong

(10) Patent No.: US 6,798,937 B1
(45) Date of Patent: Sep. 28, 2004

(54) PRESSURE ACTUATED SOLID SLUG OPTICAL LATCHING RELAY

(75) Inventor: Marvin Glenn Wong, Woodland Park, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 25 days.

(21) Appl. No.: 10/413,162

(22) Filed: Apr. 14, 2003

(51) Int. Cl.⁷ .............................. G02B 6/00; G02B 6/26; G02B 6/42

(52) U.S. Cl. .............................. 385/16; 385/12; 385/13; 385/15; 385/18; 385/31

(58) Field of Search .............................. 385/12, 13, 15, 385/16, 18, 31; 200/182, 214

(56) References Cited

U.S. PATENT DOCUMENTS

| | | | |
|---|---|---|---|
| 2,312,672 A | 3/1943 | Pollard, Jr. |
| 2,564,081 A | 8/1951 | Schilling |
| 3,430,020 A | 2/1969 | Von Tomkewitsch et al. |
| 3,529,268 A | 9/1970 | Rauterberg |
| 3,600,537 A | 8/1971 | Twyford |
| 3,639,165 A | 2/1972 | Rairden, III |
| 3,657,647 A | 4/1972 | Beusman et al. |
| 4,103,135 A | 7/1978 | Gomez et al. |
| 4,200,779 A | 4/1980 | Zakurdaev et al. |
| 4,238,748 A | 12/1980 | Goullin et al. |
| 4,245,886 A | 1/1981 | Kolodzey et al. |
| 4,336,570 A | 6/1982 | Brower |
| 4,419,650 A | 12/1983 | John |
| 4,434,337 A | 2/1984 | Becker |
| 4,475,033 A | 10/1984 | Willemsen et al. |
| 4,505,539 A | 3/1985 | Auracher et al. |
| 4,582,391 A | 4/1986 | Legrand |
| 4,628,161 A | 12/1986 | Thackrey |
| 4,652,710 A | 3/1987 | Karnowsky et al. |
| 4,657,339 A | 4/1987 | Fick |

(List continued on next page.)

FOREIGN PATENT DOCUMENTS

| | | |
|---|---|---|
| EP | 0593836 A1 | 10/1992 |
| FR | 2418539 A | 9/1979 |
| FR | 2458138 A1 | 10/1980 |
| FR | 2667396 | 9/1990 |
| JP | SHO 36-18575 | 10/1961 |
| JP | SHO 47-21645 | 10/1972 |
| JP | 63-276838 | 5/1987 |
| JP | 01-294317 | 5/1988 |
| JP | 08-125487 A | 5/1996 |
| JP | 9161640 A | 6/1997 |
| WO | WO 99/46624 A1 | 9/1999 |

OTHER PUBLICATIONS

Bhedwar, Homi C. et al. "Ceramic Multilayer Package Fabrication." Electronic Materials Handbook, Nov. 1989, pp. 460–469, vol. 1 Packaging, Section 4: Packages.

(List continued on next page.)

*Primary Examiner*—John R. Lee
*Assistant Examiner*—Mary El-Shammaa

(57) ABSTRACT

A pressure actuated optical relay containing a transparent mirror housing, located at the intersection of two optical paths. A solid slug is moved within a channel passing through the transparent mirror housing by the action of pressure exerted by an actuation fluid. The solid slug is moved in or out of the transparent mirror housing to select between the optical paths and is wetted by a liquid metal. When the solid slug is within the optical path, an incoming optical signal is reflected from a wetted surface of the slug. The liquid metal forms a surface tension bond between the slug and wettable metal surfaces within the channel to provide a latching mechanism.

25 Claims, 8 Drawing Sheets

U.S. PATENT DOCUMENTS

| | | | |
|---|---|---|---|
| 4,742,263 A | 5/1988 | Harnden, Jr. et al. | |
| 4,786,130 A | 11/1988 | Georgiou et al. | |
| 4,797,519 A | 1/1989 | Elenbaas | |
| 4,804,932 A | 2/1989 | Akanuma et al. | |
| 4,988,157 A | 1/1991 | Jackel et al. | |
| 5,278,012 A | 1/1994 | Yamanaka et al. | |
| 5,415,026 A | 5/1995 | Ford | |
| 5,502,781 A | 3/1996 | Li et al. | |
| 5,644,676 A | 7/1997 | Blomberg et al. | |
| 5,675,310 A | 10/1997 | Wojnarowski et al. | |
| 5,677,823 A | 10/1997 | Smith | |
| 5,751,074 A | 5/1998 | Prior et al. | |
| 5,751,552 A | 5/1998 | Scanlan et al. | |
| 5,828,799 A | 10/1998 | Donald | |
| 5,841,686 A | 11/1998 | Chu et al. | |
| 5,849,623 A | 12/1998 | Wojnarowski et al. | |
| 5,874,770 A | 2/1999 | Saia et al. | |
| 5,875,531 A | 3/1999 | Nellissen et al. | |
| 5,886,407 A | 3/1999 | Polese et al. | |
| 5,889,325 A | 3/1999 | Uchida et al. | |
| 5,912,606 A | 6/1999 | Nathanson et al. | |
| 5,915,050 A | 6/1999 | Russell et al. | |
| 5,972,737 A | 10/1999 | Polese et al. | |
| 5,994,750 A | 11/1999 | Yagi | |
| 6,021,048 A | 2/2000 | Smith | |
| 6,180,873 B1 | 1/2001 | Bitko | |
| 6,201,682 B1 | 3/2001 | Mooij et al. | |
| 6,207,234 B1 | 3/2001 | Jiang | |
| 6,212,308 B1 | 4/2001 | Donald | |
| 6,225,133 B1 | 5/2001 | Yamamichi et al. | |
| 6,278,541 B1 | 8/2001 | Baker | |
| 6,304,450 B1 | 10/2001 | Dibene, II et al. | |
| 6,320,994 B1 | 11/2001 | Donald et al. | |
| 6,323,447 B1 | 11/2001 | Kondoh et al. | |
| 6,351,579 B1 | 2/2002 | Early et al. | |
| 6,356,679 B1 | 3/2002 | Kapany | |
| 6,373,356 B1 | 4/2002 | Gutierrez et al. | |
| 6,396,012 B1 | 5/2002 | Bloomfield | |
| 6,396,371 B2 | 5/2002 | Streeter et al. | |
| 6,408,112 B1 | 6/2002 | Bartels | |
| 6,446,317 B1 | 9/2002 | Figueroa et al. | |
| 6,453,086 B1 | 9/2002 | Tarazona | |
| 6,470,106 B2 | 10/2002 | McClelland et al. | |
| 6,487,333 B2 | 11/2002 | Fouquet | |
| 6,501,354 B1 | 12/2002 | Gutierrez et al. | |
| 6,512,322 B1 | 1/2003 | Fong et al. | |
| 6,515,404 B1 | 2/2003 | Wong | |
| 6,516,504 B2 | 2/2003 | Schaper | |
| 6,559,420 B1 | 5/2003 | Zarev | |
| 6,633,213 B1 | 10/2003 | Dove | |
| 6,730,866 B1 * | 5/2004 | Wong et al. | 200/182 |
| 6,740,829 B1 * | 5/2004 | Wong | 200/214 |
| 6,743,991 B1 * | 6/2004 | Wong et al. | 200/182 |
| 6,750,413 B1 * | 6/2004 | Dove et al. | 200/182 |
| 2002/0037128 A1 | 3/2002 | Burger et al. | |
| 2002/0146197 A1 | 10/2002 | Yong | |
| 2002/0150323 A1 | 10/2002 | Nishida et al. | |
| 2002/0168133 A1 | 11/2002 | Saito | |
| 2003/0035611 A1 | 2/2003 | Shi | |

OTHER PUBLICATIONS

"Integral Power Resistors for Aluminum Substrate." IBM Technical Disclosure Bulletin, Jun. 1984, US, Jun. 1, 1984, p. 827, vol. 27, No. 1B, TDB–ACC–NO: NB8406827, Cross Reference: 0018–8689–27–1B–827.

Kim, Joonwon et al. "A Micromechanical Switch with Electrostatically Driven Liquid–Metal Droplet." Sensors and Actuators, A: Physical. v 9798, Apr. 1, 2002, 4 pages.

Jonathan Simon, "A Liquid–Filled Microrelay with a Moving Mercury Microdrop" (Sep. 1997) Journal of Microelectromechanical Systems, vol. 6, No. 3, pp208–216.

Marvin Glenn Wong, "A Piezoelectrically Actuated Liquid Metal Switch", May 1, 2002, patent application 10/137,691, 12 pages of specification, 5 pages of claims, 1 page of abstract, and 10 sheets of drawings (Figs. 1–10).

* cited by examiner

PRESSURE ACTUATED SOLID SLUG OPTICAL LATCHING RELAY

CROSS REFERENCE TO RELATED APPLICATIONS

This application is related to the following co-pending U.S. patent applications, being identified by the below enumerated identifiers and arranged in alphanumerical order, which have the same ownership as the present application and to that extent are related to the present application and which are hereby incorporated by reference:

Application 10010448-1, titled "Piezoelectrically Actuated Liquid Metal Switch", filed May 2, 2002 and identified by Ser. No. 10/137,691;

Application 10010529-1, "Bending Mode Latching Relay", and having the same filing date as the present application;

Application 10010531-1, "High Frequency Bending Mode Latching Relay", and having the same filing date as the present application;

Application 10010570-1, titled "Piezoelectrically Actuated Liquid Metal Switch", filed May 2, 2002 and identified by Ser. No. 10/142,076;

Application 10010571-1, "High-frequency, Liquid Metal, Latching Relay with Face Contact", and having the same filing date as the present application;

Application 10010572-1, "Liquid Metal, Latching Relay with Face Contact", and having the same filing date as the present application;

Application 10010573-1, "Insertion Type Liquid Metal Latching Relay", and having the same filing date as the present application;

Application 10010617-1, "High-frequency, Liquid Metal, Latching Relay Array", and having the same filing date as the present application;

Application 10010618-1, "Insertion Type Liquid Metal Latching Relay Array", and having the same filing date as the present application;

Application 10010634-1, "Liquid Metal Optical Relay", and having the same filing date as the present application;

Application 10010640-1, titled "A Longitudinal Piezoelectric Optical Latching Relay", filed Oct. 31, 2001 and identified by Ser. No. 09/999,590;

Application 10010643-1, "Shear Mode Liquid Metal Switch", and having the same filing date as the present application;

Application 10010644-1, "Bending Mode Liquid Metal Switch", and having the same filing date as the present application;

Application 10010656-1, titled "A Longitudinal Mode Optical Latching Relay", and having the same filing date as the present application;

Application 10010663-1, "Method and Structure for a Pusher-Mode Piezoelectrically Actuated Liquid Metal Switch", and having the same filing date as the present application;

Application 10010664-1, "Method and Structure for a Pusher-Mode Piezoelectrically Actuated Liquid Metal Optical Switch", and having the same filing date as the present application;

Application 10010790-1, titled "Switch and Production Thereof", filed Dec. 12, 2002 and identified by Ser. No. 10/317,597;

Application 10011055-1, "High Frequency Latching Relay with Bending Switch Bar", and having the same filing date as the present application;

Application 10011056-1, "Latching Relay with Switch Bar", and having the same filing date as the present application;

Application 10011064-1, "High Frequency Push-mode Latching Relay", and having the same filing date as the present application;

Application 10011065-1, "Push-mode Latching Relay", and having the same filing date as the present application;

Application 10011121-1, "Closed Loop Piezoelectric Pump", and having the same filing date as the present application;

Application 10011329-1, titled "Solid Slug Longitudinal Piezoelectric Latching Relay", filed May 2, 2002 and identified by Ser. No. 10/137,692;

Application 10011344-1, "Method and Structure for a Slug Pusher-Mode Piezoelectrically Actuated Liquid Metal Switch", and having the same filing date as the present application;

Application 10011345-1, "Method and Structure for a Slug Assisted Longitudinal Piezoelectrically Actuated Liquid Metal Optical Switch", and having the same filing date as the present application;

Application 10011397-1, "Method and Structure for a Slug Assisted Pusher-Mode Piezoelectrically Actuated Liquid Metal Optical Switch", and having the same filing date as the present application;

Application 10011398-1, "Polymeric Liquid Metal Switch", and having the same filing date as the present application;

Application 10011410-1, "Polymeric Liquid Metal Optical Switch", and having the same filing date as the present application;

Application 10011436-1, "Longitudinal Electromagnetic Latching Optical Relay", and having the same filing date as the present application;

Application 10011437-1, "Longitudinal Electromagnetic Latching Relay", and having the same filing date as the present application;

Application 10011458-1, "Damped Longitudinal Mode Optical Latching Relay", and having the same filing date as the present application;

Application 10011459-1, "Damped Longitudinal Mode Latching Relay", and having the same filing date as the present application;

Application 10020013-1, titled "Switch and Method for Producing the Same", filed Dec. 12, 2002 and identified by Ser. No. 10/317,963;

Application 10020027-1, titled "Piezoelectric Optical Relay", filed Mar. 28, 2002 and identified by Ser. No. 10/109,309;

Application 10020071-1, titled "Electrically Isolated Liquid Metal Micro-Switches for Integrally Shielded Microcircuits", filed Oct. 8, 2002 and identified by Ser. No. 10/266,872;

Application 10020073-1, titled "Piezoelectric Optical Demultiplexing Switch", filed Apr. 10, 2002 and identified by Ser. No. 10/119,503;

Application 10020162-1, titled "Volume Adjustment Apparatus and Method for Use", filed Dec. 12, 2002 and identified by Ser. No. 10/317,293;

Application 10020241-1, "Method and Apparatus for Maintaining a Liquid Metal Switch in a Ready-to-Switch Condition", and having the same filing date as the present application;

Application 10020242-1, titled "A Longitudinal Mode Solid Slug Optical Latching Relay", and having the same filing date as the present application;

Application 10020473-1, titled "Reflecting Wedge Optical Wavelength Multiplexer/Demultiplexer", and having the same filing date as the present application;

Application 10020540-1, "Method and Structure for a Solid Slug Caterpillar Piezoelectric Relay", and having the same filing date as the present application;

Application 10020541-1, titled "Method and Structure for a Solid Slug Caterpillar Piezoelectric Optical Relay", and having the same filing date as the present application;

Application 10030438-1, "Inserting-finger Liquid Metal Relay", and having the same filing date as the present application;

Application 10030440-1, "Wetting Finger Liquid Metal Latching Relay", and having the same filing date as the present application;

Application 10030521-1, "Pressure Actuated Optical Latching Relay", and having the same filing date as the present application;

Application 10030546-1, "Method and Structure for a Slug Caterpillar Piezoelectric Reflective Optical Relay", and having the same filing date as the present application.

FIELD OF THE INVENTION

The invention relates to the field of optical switching relays, and in particular to a pressure actuated optical relay that latches by means of a liquid metal.

BACKGROUND

Communications systems using optical signals require the use of optical switches and routers. An early approach to optical switching was to convert the optical signal to an electrical signal, use an electrical switch or router and then convert back to an optical signal. More recently, optical relays have been used in which an electrical control signal is used to control the switching or routing of an optical signal. Optical relays typically switch optical signals by using movable solid mirrors or by using the creation of bubbles in liquid. The moveable mirrors may use electrostatic latching mechanisms, whereas bubble switches do not latch. Piezoelectric latching relays either use residual charges in the piezoelectric material to latch, or actuate switch contacts containing a latching mechanism.

SUMMARY

This invention relates to a pressure actuated optical relay that uses a liquid metal, such as mercury, as a switching mechanism and as a latching mechanism. The relay contains a transparent mirror housing, located at the intersection of two optical paths. A solid slug is moved within a channel passing through the transparent mirror housing by the action of pressure in an actuation fluid. A surface of the solid slug is wetted by a liquid metal to form a reflective surface. The solid slug is moved in or out of the transparent mirror housing to select between the optical paths. When the solid slug is within the optical path, an incoming optical signal is reflected from the reflective surface of the liquid metal, otherwise the optical signal passes through the transparent housing. Wettable metal surfaces within the channel provide a latching mechanism.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION

Figure 1:
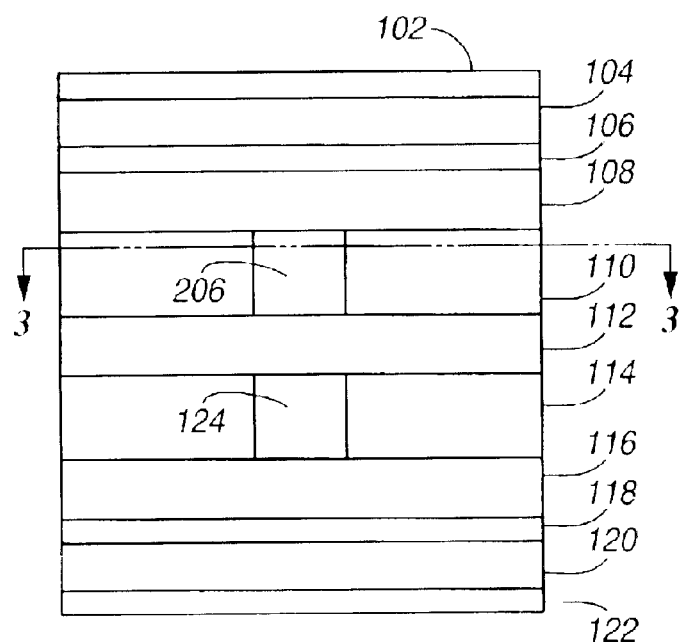
FIG. 1 is a side view of an optical relay consistent with certain embodiments of the present invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

The present invention relates to an optical relay that latches by means of a liquid metal. The liquid metal may be mercury or an alloy that contains gallium. When a small volume of liquid metal wets a surface, the surface tension of liquid metal tends to hold the liquid metal to the surface. In an optical relay of the present invention, a solid slug is used to select between two or more optical paths. The surface of the solid slug is wetted by liquid metal and surface tension is used as a latching mechanism to maintain the position of the slug.

The relay operates by means of a pressure actuator displacing the solid slug within a switching channel. The solid slug is wettable by a liquid metal and wets between contact pads to block an optical path and reflect an optical signal into an alternate path. The slug is solid, rather than liquid, hut may be hollow. In operation, pressure is applied to the ends of the switching channel to break the surface tension bond between the slug and the contact pads and move the slug out of the optical path. The surface tension bond provides a latching mechanism. The liquid metal can wet to wettable metal elements in the optical path cavity, thereby creating a mirror effect that can be used to redirect the optical signal in a different direction.

In one embodiment, the switch is made using micromachining techniques for small size. The micro-machined optical relay of the present invention is made up of a number of layers. FIG. 1 is side view of an optical relay 100 of one embodiment of the present invention. Referring to FIG. 1, the relay comprises a top cap layer 102, an upper chamber layer 104, an upper duct layer 106, an upper seal belt or spacer layer 108, an upper optical layer 110, a middle seal belt or spacer layer 112, a lower optical layer 114, a lower seal belt or spacer layer 116, a lower duct layer 118, a lower chamber layer 120 and a bottom cap layer 122. The upper optical layer 110 contains an input optical path or waveguide and two output optical paths or waveguides. One of the output waveguides 206 constitutes part of a first reflected path through the relay. Layer 114 may optionally contain additional optical waveguides and function as a lower optical layer. Waveguide 124 constitutes part of a second (optional) reflected path. The spacer layers 108, 112, and 116 contain seal belt metal contacts that provide the latching mechanism for the relay and will be referred to as the upper, middle and lower seal belt layers respectively.

Figure 2:
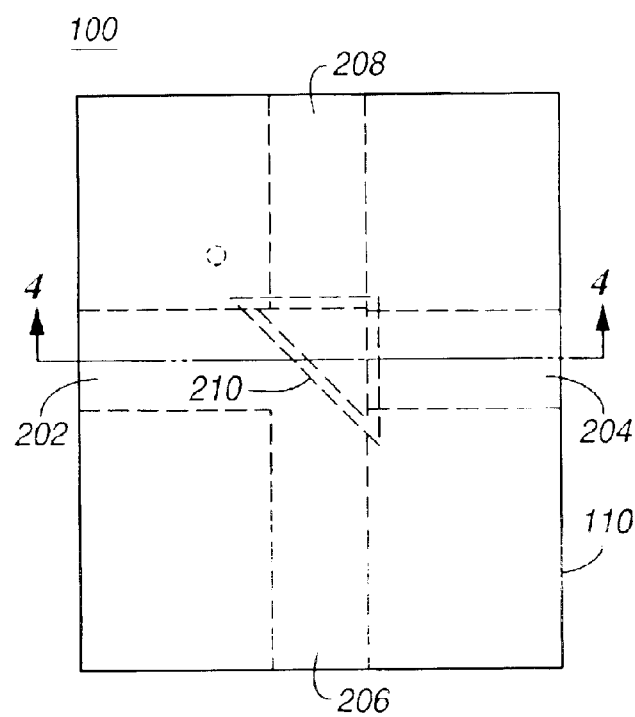
FIG. 2 is a top view of an optical relay consistent with certain embodiments of the present invention.

FIG. 2 is a top view of an optical relay in accordance with one embodiment of the invention. The broken lines indicate hidden structure that includes a first input waveguide 202, a second input waveguide 208, a first output waveguide 204 and a second output waveguide 206. A triangular mirror housing 210 extends vertically through the optical paths.

Figure 3:
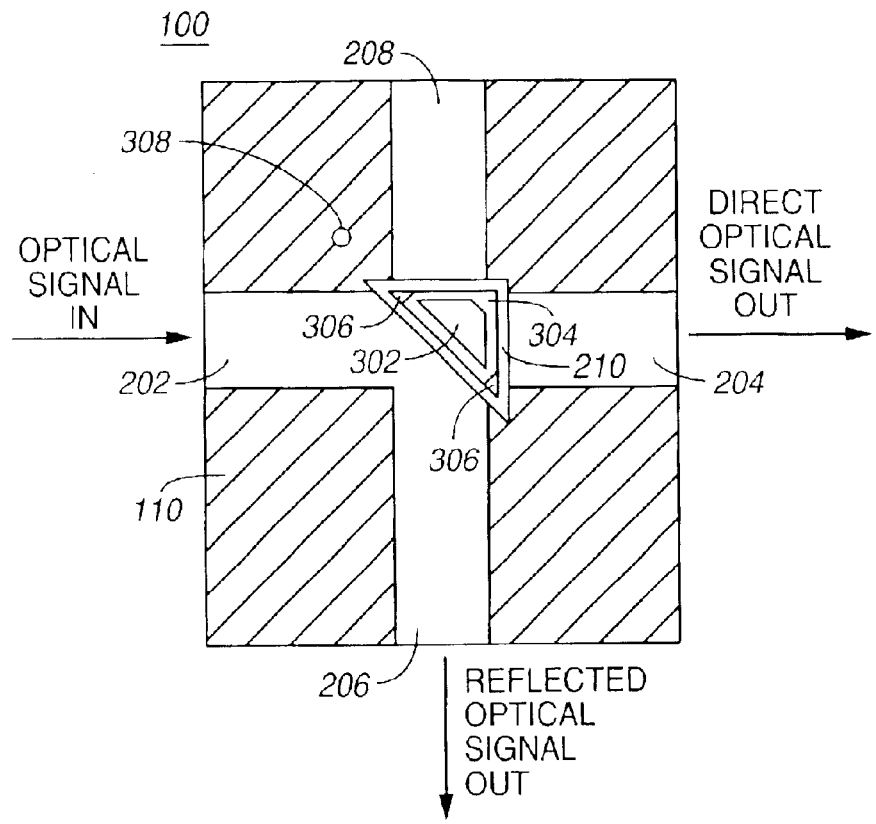
FIG. 3 is a sectional view through an optical layer of an optical relay consistent with certain embodiments of the present invention.

FIG. 3 is a sectional view through the section 3—3 shown in FIG. 1. The section is taken through the upper optical layer 110. The first output waveguide 204 is optically aligned with the first input waveguide 202 to form a first direct optical path through the layer. The second output waveguide 206 may be optically aligned with an optional second input waveguide 208 to form a second direct optical path through the layer. The second optical output path or waveguide 206 intersects the direct optical path. In operation, an optical signal enters path 202 (from the left in the figure) and either passes directly through the relay via path 204 or is deflected to exit the relay through path 206. A transparent, hollow tube 210 is located at the intersection of the paths 202 and 206. The transparent, hollow tube 210 is also referred to as a transparent mirror housing in the sequel. The axis of tube is substantially perpendicular to the layer 110. Tubes having other than triangular cross-sectional shapes may be used, however, one face of the tube should be planar and angled so that the normal to the face bisects the angle between the path 202 and the path 206. In FIG. 3, the paths are at right angles, so the face is angled at 45°. Other angles may be used without departing from the present invention. A solid slug 302 is positioned in a switching channel that passes through the transparent tube 210, and is free to slide axially along the switching channel. The slug is wetted by a liquid metal 304. Where the transparent tube passes through the optical layer, the corners of the transparent tube are filled with a wettable metal 112. The liquid metal 304 is drawn across the face of the transparent tube by the surface tension attracting the liquid metal to the wettable metal 306 in the corners of the tube. As a result, the surface of the liquid metal is planar and highly reflective. An optical signal entering the channel 202 is reflected from the surface of the liquid metal and exits the relay through channel 206. When the solid slug is moved out of the path of the optical signal, the optical signal passes through the transparent tube and exits the relay through channel 204. In operation, the solid slug moves axially along the channel through the transparent tube. A small-diameter pressure equalization passage 308 allows pressure to be slowly equalized across the solid slug. This is discussed further below with reference to FIG. 4.

Figure 4:
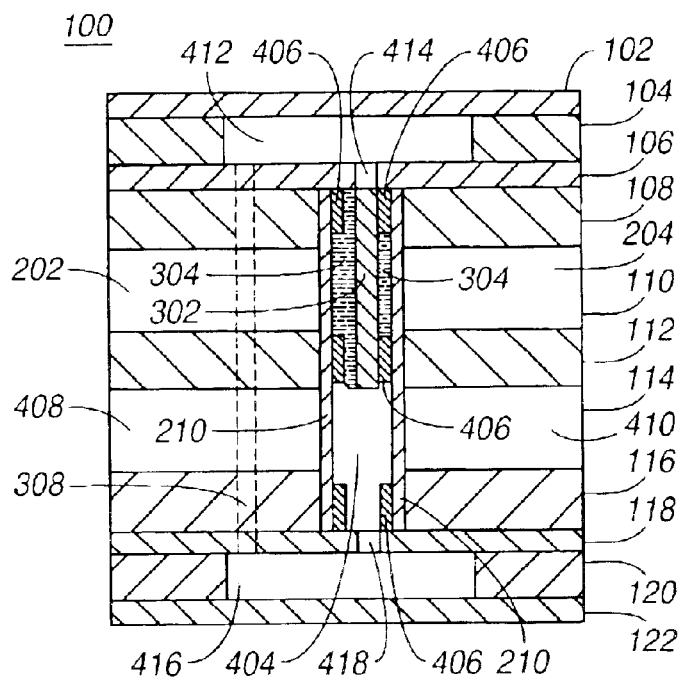
FIG. 4 is a sectional view through an optical relay array consistent with certain embodiments of the present invention.

FIG. 4 shows a sectional view along the section 4—4 in FIG. 2. The optical relay 100 is made up of a number of layers that may be formed by micro-machining. A pressure equalization passage 308 connects chamber 412 with chamber 416. The passage has a small cross-sectional area relative to the ducts 414 and 418. Creation of pressure fluctuations in a chamber (e.g. 412) primarily acts on the solid slug 302 to move it. After the slug has moved to its new position, the pressure change is relieved slowly through the passage 308 so that releasing the pressure fluctuation does not cause the slug 302 to be "sucked back" to its original position. Layers 108, 112 and 116 contain contact pads or seal belts 406. Theses contact pads are wettable by the liquid metal. The transparent mirror housing 210 extends between the upper seal belt layer 108 and the lower seal belt layer 116. Alternatively, two separate mirror housings may be used, one in each of the optical layers 110 and 114. In this embodiment, there are two optical layers, 110 and 114. In general, a single layer could be used, or multiple layers created by stacking relays on top of each other. Liquid metal 304, coating solid slug 302, wets between the seal belts 406 in the upper seal belt layer 108 and the middle seal belt layer 112. In this position, the wetted surface of the solid slug reflects light out of the relay along waveguide 206. The slug may be moved by increasing the pressure of an inert actuation fluid in chamber 412 in the upper chamber layer 104. The increased pressure moves actuation fluid along the duct 414 in the upper duct layer 106 into the switching channel 404. This breaks the liquid connection between the slug and the seal belts and moves the slug down the switching channel. As a result, the slug fills the space between the middle and lower seal belts (in the layers 112 and 116 respectively). Light entering the relay in the upper optical layer 10 can now pass through the transparent mirror housing and exit the relay along the direct path. Light entering the relay the lower optical layer 114 along path 408 is reflected by the liquid metal and exits the relay along path 124. A corresponding chamber 416 in the lower chamber layer 120 is connected via duct 418 in the lower duct layer 118 to the lower end of the switching channel 404 in the mirror housing 210. Increasing the pressure of an inert actuation fluid in this chamber moves the slug back up the switching channel.

Figure 5:
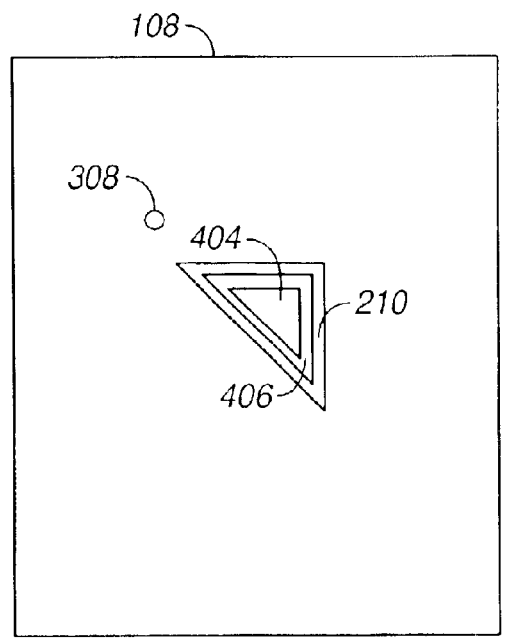
FIG. 5 is a top view of a seal belt layer of an optical relay consistent with certain embodiments of the present invention.

FIG. 5 is a top view of the upper seal belt layer 108 of a relay array. The middle and lower seal belt layers have similar structures. Triangular holes in the layer support the transparent mirror housing 210 and the seal belt contact 406. Layers 112 and 116 have similar structures. In a further embodiment, the transparent mirror housing 210 is located only in the optical layers, and the seal belt contact 406 lines the triangular hole in the layer. The pressure equalization passage 308 passes through the layer 108 to connect the upper and lower pressure chambers.

Figure 6:
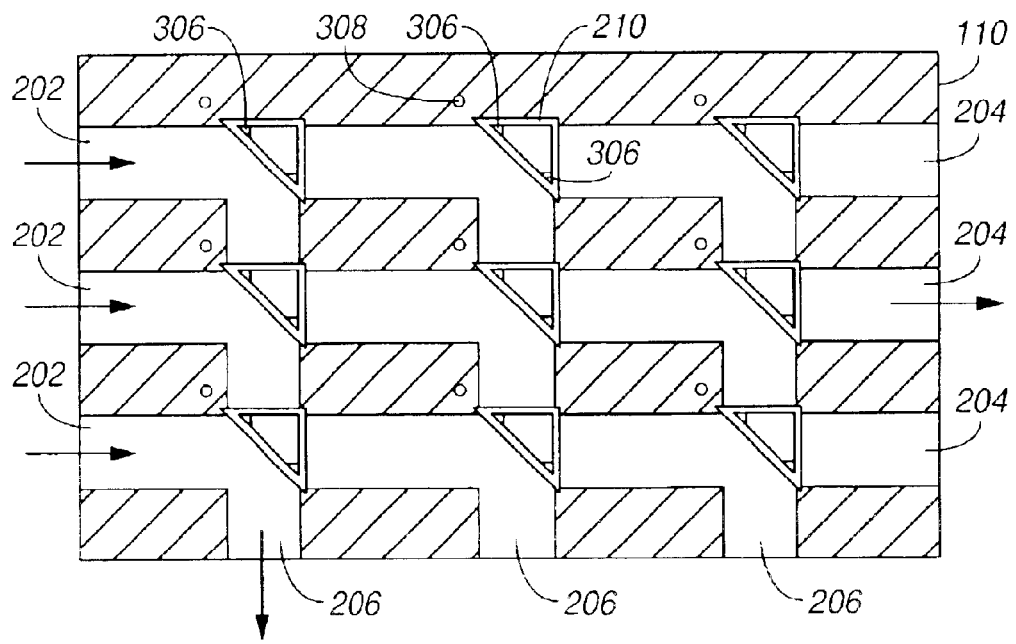
FIG. 6 is a sectional view through an optical layer of an optical relay array consistent with certain embodiments of the present invention.

As illustrated in FIG. 6, multiple relays may be integrated to form a switching array. FIG. 6 is a sectional view through an upper optical layer 110 of a relay array. An optical signal entering the relay array along any of the three input waveguides 202 may be switched to any one of the three outputs 206 or allowed to pass directly through the relay and exit along the corresponding waveguide 204. Wettable metal 306 fills the corners of the transparent mirror housing, to draw the liquid metal across the face of the housing and form a reflective surface. Pressure equalization passages 308 pass through the layer 110 to connect the upper pressure chambers with corresponding lower pressure chambers.

Figure 7:
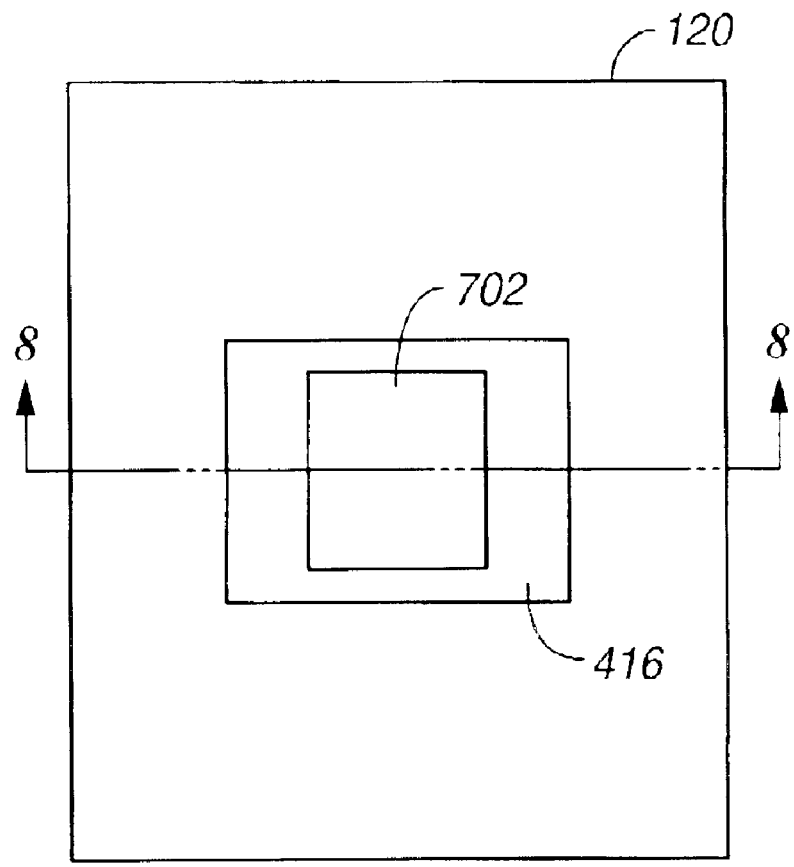
FIG. 7 is a top view of a lower chamber layer of an optical relay consistent with certain embodiments of the present invention utilizing a heater.

FIG. 7 is a top view of the lower chamber layer 120 and bottom cap layer in accordance with one embodiment of the invention. The pressure in lower pressure chamber 416 is increased by energizing a pressure actuator 702. The resulting pressure difference across the solid slug moves it up the switching channel. In this embodiment, the pressure actuator 702 is a heater resistor. When the heater 702 is energized, the pressure of an inert gas in the chamber 416 is increased. This in turn creates a pressure differential across the solid slug, causing it to move along the switching channel.

Figure 8:
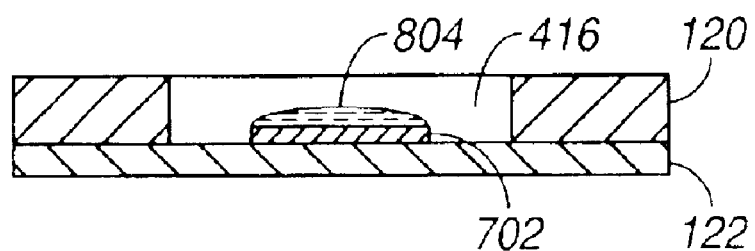
FIG. 8 is a sectional view through lower actuation layers of an optical relay consistent with certain embodiments of the present invention utilizing a heater.

FIG. 8 is a sectional view through the section 8—8 in FIG. 7. The pressure actuator 702 and associated circuitry may be deposited on the upper surface of bottom cap layer 122. A second heater resistor is positioned within the upper chamber pressure and is used to move the solid slug down the switching channel.

Figure 9:
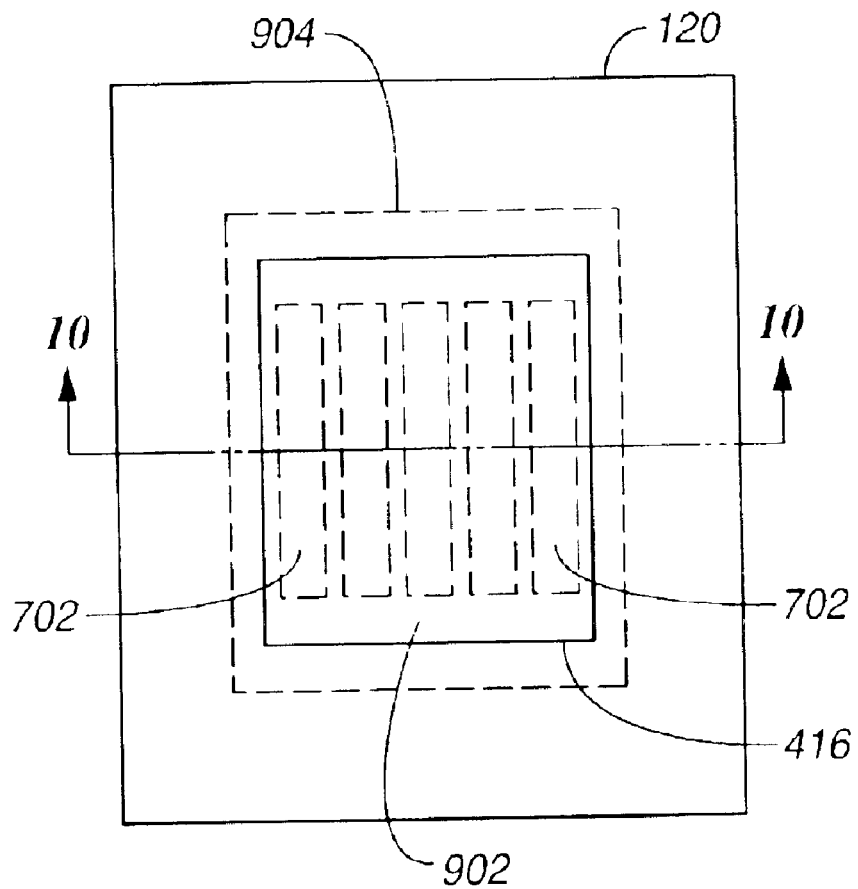
FIG. 9 is a top view of lower actuation layers of an optical relay consistent with certain embodiments of the present invention utilizing piezoelectric elements operating in a bending mode.

In a further embodiment of the present invention, a phase-change liquid 804 is in wetted contact with the heater resistor 702. When heated, the liquid changes from a liquid phase to a gas phase and in so doing increases in volume. This volume change increases the pressure in the actuation fluid and activates the switch. When the heater 702 cools, the phase-change liquid condenses on the heater. A second phase-change liquid is in wetted contact with the heater in the lower pressure chamber and operates in a similar manner. The phase-change liquid may be an inert organic liquid such as a low viscosity Fluorinert manufactured by 3M. Use of phase-change liquid may provide faster switching times as compared with gas heating. In turn, this reduces energy losses into the substrate FIG. 9 is a top view of the lower chamber layer 120 and bottom cap layer in accordance with one embodiment of the invention. The pressure in lower pressure chamber 416 is increased by energizing a number of pressure actuators 702. In this embodiment, the pressure actuators 702 are piezoelectric elements acting on a flexible diaphragm 902 that forms one side of the lower pressure chamber 416. The piezoelectric elements are contained within a back cavity 904.

Figure 10:
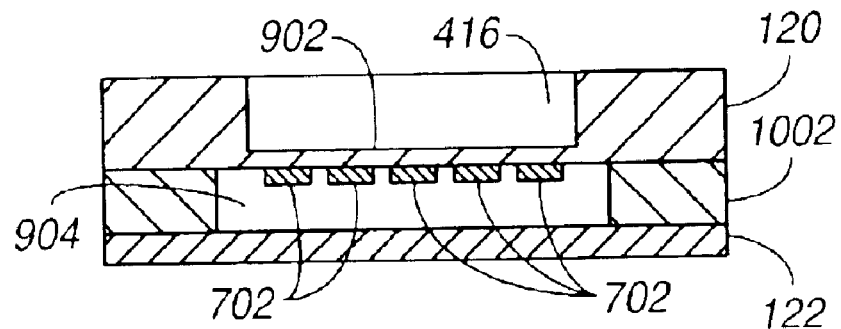
FIG. 10 is a sectional view through lower actuation layers of an optical relay consistent with certain embodiments of the present invention utilizing piezoelectric elements operating in a bending mode.

FIG. 10 is a sectional view through section 10—10 in FIG. 9. The pressure in chamber 416 is controlled by the action of piezoelectric elements 702 acting on a flexible diaphragm 902. The piezoelectric elements 702 are configured to deform in a bending mode when a voltage is applied across them. The polarity of the voltage determines whether the volume of the chamber 416 is increased or decreased, so the actuators may increase or decrease the pressure in the chamber. A corresponding set of piezoelectric actuators control the pressure in the upper pressure chamber. The slug may be moved upwards in the channel by increasing the pressure in lower chamber 416 and, optionally, decreasing the pressure in upper chamber. The backing chamber 904 may be formed as a cavity in the bottom cap layer 122, or by placing a spacing layer 1002 between the chamber layer 120 and the bottom cap layer 122. The backing chamber may be created by micro-machining techniques.

Figure 11:
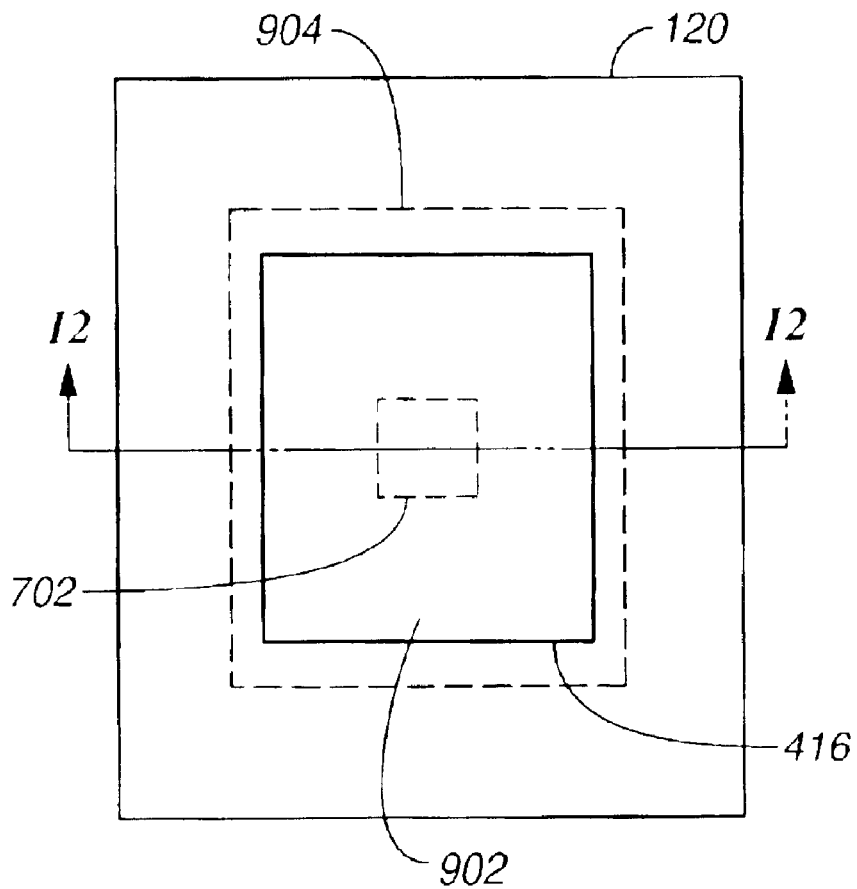
FIG. 11 is a top view of lower actuation layers of an optical relay consistent with certain embodiments of the present invention utilizing piezoelectric elements operating in an extensional mode.

FIG. 11 is a top view of the lower chamber layer 120 and bottom cap layer in accordance with a further embodiment of the invention. In this embodiment, the pressure actuator 702 is a piezoelectric element that deforms in an extensional (vertical) mode when a voltage is applied across it. The actuator 702 is located within a backing chamber 904 and acts on a flexible diaphragm 902 that forms one side of the lower pressure chamber 416.

Figure 12:
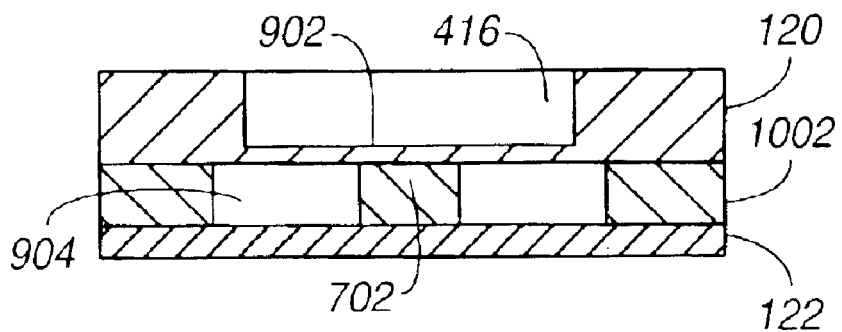
FIG. 12 is a sectional view through lower actuation layers of an optical relay consistent with certain embodiments of the present invention utilizing piezoelectric elements operating in an extensional mode.

FIG. 12 is a sectional view through the section 12—12 in FIG. 11. The piezoelectric element 702 is configured to deform in an extensional mode when a voltage is applied across it, and thereby deflect the diaphragm 902 that partially bounds the chamber 416. The polarity of the voltage determines whether the volume of the chamber 416 is increased or decreased, so the actuator may increase or decrease the pressure in the chamber. A corresponding piezoelectric actuator controls the pressure in the upper chamber. Electrical connections to the actuator 702 pass through the cap layer 122 and facilitate the connection of external control signals. Alternatively, the connections may be traces formed on the circuit layer that terminate the edge of the layer. The slug may be moved upwards by increasing the pressure in chamber 416 and, optionally, moved downwards by decreasing the pressure in chamber 416.

Figure 13:
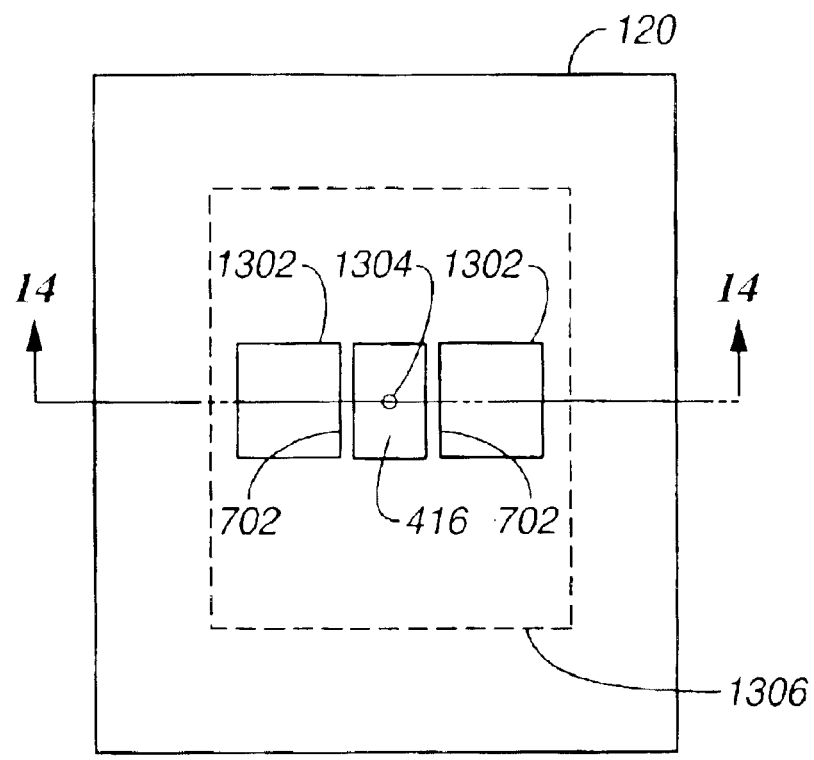
FIG. 13 is a top view of lower actuation layers of an optical relay consistent with certain embodiments of the present invention utilizing piezoelectric elements operating in a shearing mode.

FIG. 13 is a top view of the lower chamber layer 120 and bottom cap layer in accordance with a still further embodiment of the invention. In this embodiment, the pressure actuator 702 comprises a number of piezoelectric elements that deform in a shearing mode when a voltage is applied across them. The polarity of the voltage determines whether the volume of the chamber 416 is increased or decreased, so the actuators may increase or decrease the pressure in the chamber. A corresponding set of piezoelectric actuators control the pressure in the lower chamber. Operation of the actuators is described below with reference to FIGS. 15 and 16. The action of the piezoelectric actuators 702 forces actuation fluid out of the chamber 416, through the duct in the lower duct layer and into the switching channel in the mirror housing. The piezoelectric elements are backed by cavities 1302. Pressure equalization is provided by a duct 1304 that couples the chamber 416 to a fluid reservoir 1306. A further pressure equalization passage (not shown) couples the lower fluid reservoir 1306 to the upper reservoir (at the other end of the transparent mirror housing).

Figure 14:
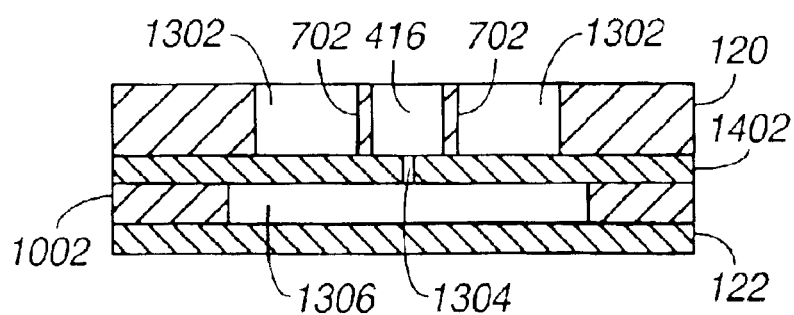
FIG. 14 is a sectional view through lower actuation layers of an optical relay consistent with certain embodiments of the present invention utilizing piezoelectric elements operating in a shearing mode.

FIG. 14 is a sectional view through the section 14—14 in FIG. 13. The piezoelectric elements 702 partially bound the pressure chamber 416 and separate it from backing chambers 1302. Actuation fluid may flow between the pressure chamber 416 and the fluid reservoir 1306 through vent 1304 in the vent layer 1402. The vent is sized to restrict fluid flow, so that the pumping action of the piezoelectric elements is not impaired. The reservoir may be formed in the cap layer 122 or formed by placing a spacer layer 1002 between the cap layer and the vent layer 1402. A further pressure equalization passage (not shown) couples the lower fluid reservoir 1306 to the upper reservoir (at the other end of the transparent mirror housing).

Figure 15:
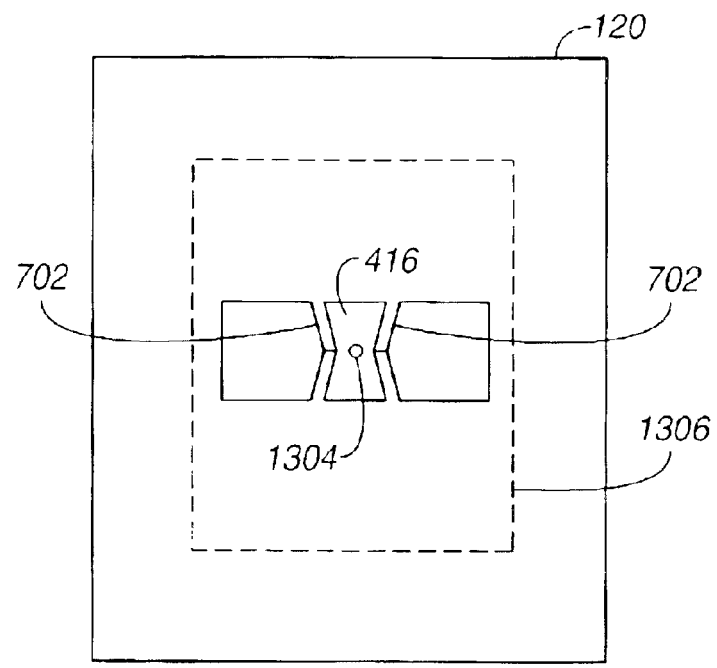
FIG. 15 is a further top view of lower actuation layers of an optical relay consistent with certain embodiments of the present invention utilizing piezoelectric elements operating in a shearing mode.
Figure 16:
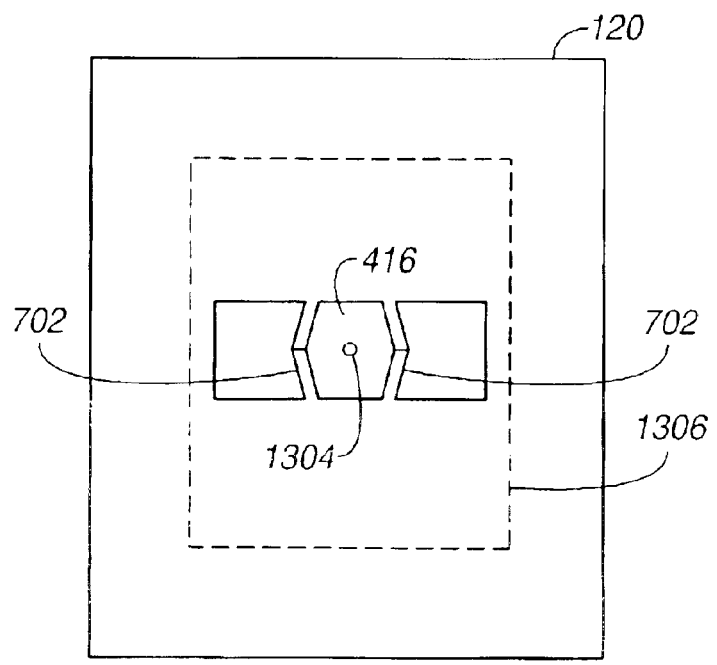
FIG. 16 is a still further top view of lower actuation layers of an optical relay consistent with certain embodiments of the present invention utilizing piezoelectric elements operating in a shearing mode.

FIG. 15 and FIG. 16 illustrate the operation of the piezoelectric actuators. Referring to FIG. 15, each of the actuators 702 is made up of two piezoelectric elements coupled edge to edge and deformed in a shear mode. When sheared inwards, as shown in FIG. 15, the volume of chamber 416 is decreased. When sheared outwards, as shown in FIG. 16, the volume of chamber 416 is increased. The actuators in the upper pressure chamber may be operated in phase opposition to the lower actuators to increase the pressure difference across the solid slug.

In a further embodiment, a single pressure actuator that can both increase and decrease pressure is used. The decrease in pressure is used to pull the solid slug in one direction and push it in the other.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. An optical relay comprising:

a first input optical waveguide;

a first output optical waveguide, optically aligned with the first input optical waveguide to form a first direct optical path;

a second output optical waveguide intersecting the first input optical waveguide;

a transparent mirror housing, located at the intersection of the first input optical waveguide and the second output optical waveguide;

a solid slug adapted to move within a switching channel passing through the transparent mirror housing, the solid slug having a wettable surface;

a liquid metal volume in wetted contact with the wettable surface of the solid slug and forming a reflective surface;

a first pressure actuator operable to move the solid slug within the switching channel so that it blocks the first direct optical path and completes a first reflected optical path from the first input optical waveguide to the second output optical waveguide; and a second pressure actuator operable to move the solid slug within the switching channel to remove it from the first direct optical path.

2. An optical relay in accordance with claim 1, further comprising a metal coating applied to a position of the interior of the transparent mirror housing, the metal coating being wettable by liquid metal.

3. An optical relay in accordance with claim 2, wherein the transparent mirror housing is a triangular tube and the metal coating is applied to the corners of the transparent mirror housing, the metal coating tending to cause the liquid metal to form a reflective surface.

4. An optical relay in accordance with claim 2, wherein the metal coating is applied to the interior of the channel above and below the direct and reflected optical paths and is wettable by the liquid metal.

5. An optical relay in accordance with claim 1, further comprising:

a first wettable metal contact located in the switching channel above the first direct and first reflected optical paths;

a second wettable metal contact located in the switching channel below the first direct and first reflected optical paths; and a third wettable metal contact located in the switching channel below the second wettable metal contact.

6. An optical relay in accordance with claim 5, wherein the first direct optical path passes between the first and second wettable metal contacts and further comprising:
- a second input optical waveguide;
- a third output optical waveguide, optically aligned with the first input optical waveguide to form a second direct optical path passing between the second and third wettable metal contacts; and
- a fourth output optical waveguide intersecting the second input optical waveguide at the transparent mirror housing to form a second reflected optical path.

7. An optical relay in accordance with claim 1, wherein the first pressure actuator comprises:
- a first pressure chamber containing an actuation fluid; and
- a first duct opening to the first pressure chamber and to a first end of the switching channel.

8. An optical relay in accordance with claim 7, wherein the second pressure actuator comprises:
- a second pressure chamber containing an actuation fluid; and
- a second duct opening to the second pressure chamber and to a second end of the switching channel.

9. An optical relay in accordance with claim 8, further comprising a pressure equalization passage opening to the first pressure chamber and the second pressure chamber.

10. An optical relay in accordance with claim 7, wherein the first pressure actuator further comprises:
- a heater resistor located within the first pressure chamber and operable to raise the temperature of the actuation fluid in the first pressure chamber.

11. An optical relay in accordance with claim 7, wherein the first pressure actuator further comprises:
- a heater resistor located within the first pressure chamber; and
- a phase-change liquid in wetted contact with the heater resistor;

wherein the heater resistor operable to raise the temperature of the phase-change and thereby cause it to evaporate.

12. An optical relay in accordance with claim 7, wherein the first pressure actuator further comprises:
- a first pair of piezoelectric elements partially bounding the first pressure chamber and operable to deform in a shearing mode to change the volume of the first pressure chamber.

13. An optical relay in accordance with claim 12, wherein the first pressure actuator further comprises:
- a second pair of piezoelectric elements partially bounding the first pressure chamber and operable to deform in a shearing mode to change the volume of the first pressure chamber.

14. An optical relay in accordance with claim 7, wherein the first pressure actuator further comprises:
- a flexible diaphragm partially bounding the first pressure chamber;
- at least one piezoelectric element attached to the flexible diaphragm and operable to deform in a bending mode and thereby deflect the diaphragm;

wherein deflection of the flexible diaphragm alters the volume of the first pressure chamber.

15. An optical relay in accordance with claim 7, wherein the first pressure actuator further comprises:
- a flexible diaphragm partially bounding the first pressure chamber;
- a piezoelectric element attached to the flexible diaphragm and operable to deform in an extensional mode and thereby deflect the diaphragm;

wherein deflection of the flexible diaphragm alters the volume of the first pressure chamber.

16. An optical relay in accordance with claim 1, wherein the transparent mirror housing extends substantially the whole length of the switching channel.

17. An optical relay array comprising:
- a plurality of input optical paths;
- a plurality of first output optical paths, optically aligned with the plurality of input optical paths to form a plurality of direct optical paths;
- a plurality of second output optical paths intersecting the plurality of input optical path at a plurality of intersections; and
- at each intersection of the plurality of intersections:
  - a transparent mirror housing;
  - a solid slug moveably located within a channel passing through the transparent mirror housing, the solid slug having a wettable surface;
  - a liquid metal volume in wetted contact with the wettable surface of the solid slug and operable to form a reflective surface;
  - a first pressure actuator operable to move the solid slug within the channel so that it blocks a direct optical path of the plurality of direct optical paths and completes a reflected optical path from an input optical path of the plurality of input optical paths to a second output optical path of the plurality of second output optical paths; and
  - a second pressure actuator operable to move the solid slug within the channel to remove the solid slug from a direct optical path of the plurality of direct optical paths.

18. A method for selecting between a direct optical path and a reflected optical path in an optical relay having a solid slug moveable within a switching channel in response to the pressure of an actuation fluid, the method comprising:
- coupling an input optical signal to an input optical waveguide of the optical relay, the input optical waveguide being optically aligned with a first output optical waveguide to form the direct optical path;
- if the direct optical path is to be selected:
  - energizing a first pressure actuator to move the solid slug out of the direct optical path, whereby the input optical waveguide is optically coupled to first output optical waveguide; and
- if the reflected optical path is to be selected:
  - energizing a second pressure actuator to move the solid slug into the direct optical path, whereby the input optical signal is reflected from a wetted surface of the solid slug into a second output optical waveguide to complete the reflected optical path.

19. A method in accordance with claim 18, wherein energizing a pressure actuator of the first and second pressure actuators comprises:
- changing the pressure of the actuation fluid in a pressure chamber coupled to the switching channel.

20. A method in accordance with claim 19, wherein energizing a pressure actuator of the first and second pressure actuators further comprises:
- passing an electrical current through a heater resistor in the pressure chamber to increase the temperature of the actuation fluid.

21. A method in accordance with claim 19, wherein energizing a pressure actuator of the first and second pressure actuators further comprises:

passing an electrical current through a heater resistor in the pressure chamber to increase the temperature of a phase-change liquid in wetted contact with the heater resistor to cause the phase-change liquid to evaporate.

22. A method in accordance with claim 19, wherein energizing a pressure actuator of the first and second pressure actuators further comprises:

applying an electrical voltage across a piezoelectric element partially bounding the pressure chamber to cause it to deform in a shearing mode and thereby alter the volume of the pressure chamber.

23. A method in accordance with claim 19, wherein energizing a pressure actuator of the first and second pressure actuators further comprises:

applying an electrical voltage across a piezoelectric element attached to a diaphragm that partially bounds the pressure chamber to cause the piezoelectric element to deform in a bending mode, thereby deflecting the diaphragm and altering the volume of the pressure chamber.

24. A method in accordance with claim 19, wherein energizing a pressure actuator of the first and second pressure actuators further comprises:

applying an electrical voltage across a piezoelectric element attached to a diaphragm that partially bounds the pressure chamber to cause the piezoelectric element to deform in an extensional mode, thereby deflecting the diaphragm and altering the volume of the pressure chamber.

25. A method for selecting between a direct optical path and a reflected optical path in an optical relay having a solid slug moveable within a switching channel in response to the pressure of an actuation fluid, the method comprising:

coupling an input optical signal to an input optical waveguide of the optical relay, the input optical waveguide being optically aligned with a first output optical waveguide to form the direct optical path;

if the direct optical path is to be selected:

energizing a pressure actuator to change the pressure of the actuation fluid in a first direction and move the solid slug out of the direct optical path, whereby the input optical waveguide is optically coupled to first output optical waveguide; and if the reflected optical path is to be selected:

energizing the pressure actuator to change the pressure of an actuation fluid in a second direction and move the solid slug into the direct optical path, whereby the input optical signal is reflected from a surface of the solid slug into a second output optical waveguide to complete the reflected optical path.

* * * * *

UNITED STATES PATENT AND TRADEMARK OFFICE
CERTIFICATE OF CORRECTION

PATENT NO.     : 6,798,937 B1
DATED          : September 28, 2004
INVENTOR(S)    : Marvin Glenn Wong It is certified that error appears in the above-identified patent and that said Letters Patent is hereby corrected as shown below:

<u>Column 10,</u>
Line 40, after "applied to a", delete "position" and insert -- portion --

Signed and Sealed this

First Day of March, 2005

JON W. DUDAS
*Director of the United States Patent and Trademark Office*